(12) United States Patent
Fomby

(10) Patent No.: US 7,152,551 B1
(45) Date of Patent: Dec. 26, 2006

(54) HAY FEEDER

(76) Inventor: Kenneth Alexander Fomby, 4450 W. Highway 82, P.O. Box 636, Gainesville, TX (US) 76240

( * ) Notice: Subject to any disclaimer, the term of this patent is extended or adjusted under 35 U.S.C. 154(b) by 0 days.

(21) Appl. No.: 11/224,884

(22) Filed: Sep. 12, 2005

(51) Int. Cl.
*A01K 1/10* (2006.01)
*A01K 5/00* (2006.01)

(52) U.S. Cl. ........................................ 119/60; 119/61.1

(58) Field of Classification Search ............... 119/60, 119/61.1, 51.03, 515, 51.01, 521, 61.3, 706, 119/248, 252, 408, 412, 413, 464, 469, 473, 119/472, 218, 224, 246; 248/95; 211/12, 211/46, 85.15, 184; 47/29.6, 33; 256/73; 160/351, 327; 126/551, 544, 546, 547, 548; D30/131

See application file for complete search history.

(56) References Cited

U.S. PATENT DOCUMENTS

| | | | | |
|---|---|---|---|---|
| 54,005 A | * | 4/1866 | Moore | 119/60 |
| D11,853 S | * | 7/1880 | Wiard | D30/121 |
| 1,092,314 A | * | 4/1914 | White | 119/51.03 |
| 1,462,893 A | * | 7/1923 | Wingrove | 119/60 |
| 4,371,148 A | * | 2/1983 | Harden | 256/26 |
| 4,488,510 A | * | 12/1984 | Lundgren, Sr. | 119/60 |
| 5,144,909 A | * | 9/1992 | Tominaga | 119/248 |
| 5,522,345 A | * | 6/1996 | Payne | 119/60 |
| 5,528,857 A | * | 6/1996 | Ashleigh et al. | 47/78 |
| 5,626,747 A | * | 5/1997 | Ritzow et al. | 210/169 |

* cited by examiner

*Primary Examiner*—Son T. Nguyen
(74) *Attorney, Agent, or Firm*—Kevin Mark Klughart

(57) ABSTRACT

A hay feeder system which incorporates a curved arcuate section of plastic or other semi-rigid material formed to mate with the corner of an animal stall or other animal pen is disclosed. The hay feeder system permits easy placement of hay or other feed for a horse or other animal to feed on. Additionally, the disclosed invention permits easy cleaning of the hay or other feed from the floor surrounding the hay feeder.

10 Claims, 10 Drawing Sheets

0100

*Prior Art*

0200

*Prior Art*

0300

*Prior Art*

HAY FEEDER

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO MICROFICHE APPENDIX

Not Applicable

FIELD OF THE INVENTION

The present invention generally relates to hay feeders for livestock and specifically hay feeders designed to dispense hay to horses.

PRIOR ART AND BACKGROUND OF THE INVENTION

Overview (0100, 0200, 0300)

The prior art is generally illustrated in FIG. 1 (0100), FIG. 2 (0200), and FIG. 3 (0300). These will now be discussed in detail.

The prior art teaches a variety of hay bins as generally illustrated by U.S. Design Pat. 392,777 reproduced in FIG. 1 (0100). While these structures are easily constructed they suffer from a practical problem in that they are difficult to clean and in some circumstances restrict access to the hay by feeding animals such as horses and the like.

FIG. 2 (0200) illustrates one typical embodiment taught by the prior art in U.S. Design Pat. 449,905 in which the hay feeder is attached to the corner of an animal stall. This construction approach is useful in that the stall corner is an ideal position to provide for hay feeding, but the illustrated construction suffers from waste in that the hay is not properly contained, and additionally the horse or other animal may find it difficult to access the hay from the feeder.

FIG. 3 (0300) illustrates a prior art hay feeder as detailed in U.S. Utility Patent 4,488,510. This construction substantially mimics that of FIG. 2 (0200), but forces the feeding animal to feed from side portals in the hay feeder. Many animals, including horses, will find it difficult to feed in this manner. Additionally, this construction tends to scatter hay on the stall floor, creating a maintenance issue regarding stall cleanup. Furthermore, many animals such as horses prefer to eat hay from the ground (as they do in a pasture), and the structure illustrated in FIG. 3 (0300) forces placement of the feeder above the ground. This is a non-ergonomic position for feeding horses and many other animals.

DEFICIENCIES IN THE PRIOR ART

The prior art suffers from significant deficiencies, including but not limited to providing for hay access to the feeding animal, lack of hay containment, increased stall maintenance due to scattered hay, and a lack of ergonomics in regard to the actual hey feeding by the animal.

OBJECTIVES OF THE INVENTION

Accordingly, the objectives of the present invention are (among others) to circumvent the deficiencies in the prior art and affect the following objectives:
 (1) Provide for a hay feeder that is ergonomically compatible with the feeding of horses and other livestock.
 (2) Provide a hay feeder that can be installed and removed without use of tools.
 (3) Provide a hay feeder that is easily cleaned and maintained.
 (4) Provide a hay feeder that localizes hay placement to reduce stall maintenance.
 (5) Provide a hay feeder that is inexpensive and easily installed.
 (6) Provide a hay feeder that maximizes useful space in an animal stall.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview (0400)

The present invention and typical application is generally illustrated in FIG. 4 (0400) wherein the hay feeder (0401) is attached to two corner walls (0402, 0403) of an animal stall and is used to feed hay to a horse (0404) or other animal.

General Construction (0500)

The present invention can be generally illustrated by the preferred exemplary embodiment illustrated by the construction diagram of FIG. 5 (0500). The elements of the present invention generally include the following:
 A flexible arcuate front wall (0501) with one or more optional air vents (0511);
 Retaining wall clips (0502, 0503) attached to the sides of the arcuate front wall (0501);
 Stall slide rails (0504, 0505) which mate with the retaining wall clips (0502, 0503) to secure the arcuate front wall (0501) in the corner of animal stall walls (0506, 0507).

This system as illustrated in FIG. 5 (0500) may be constructed of a wide variety of materials. However, a preferred embodiment utilizes plastic as the primary construction material, as this material is easily fabricated, easily cleaned, is not harmful to livestock, and possesses the flexibility to achieve the arcuate form desired by the front wall (0501) construction.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
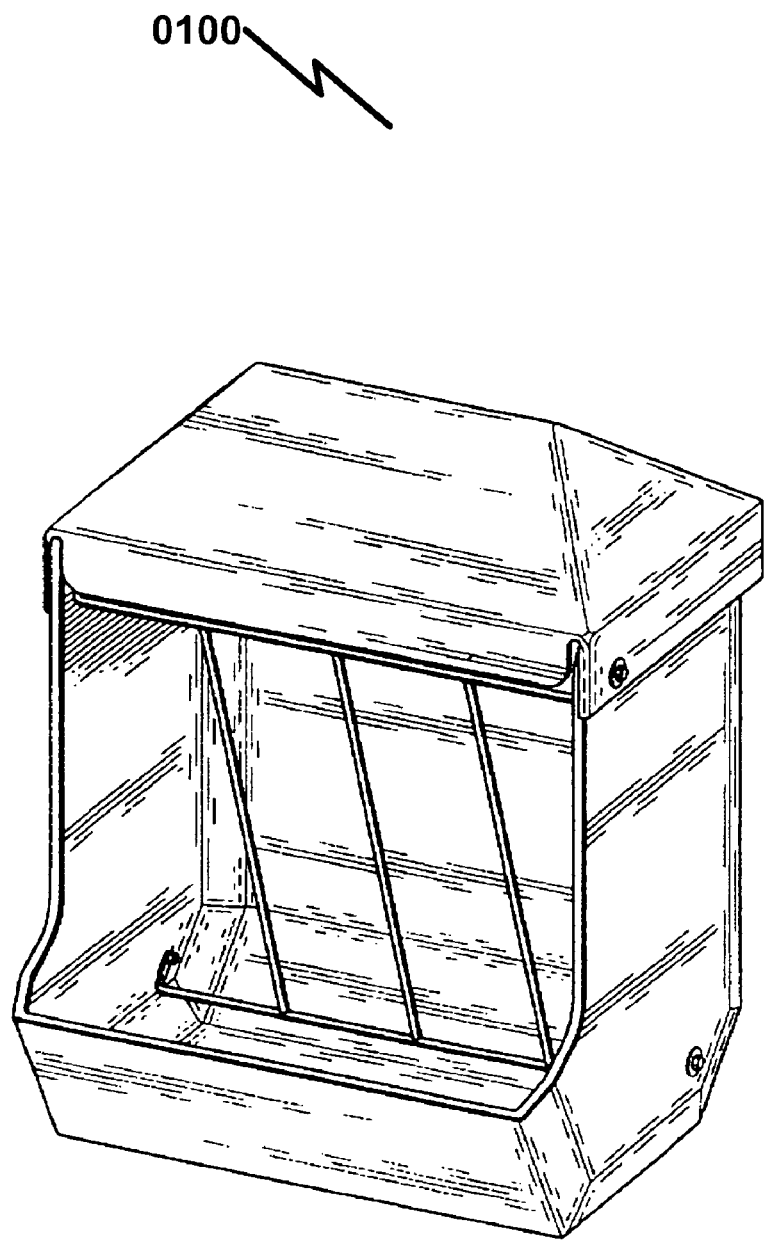
FIG. 1 illustrates a prior art hay feeder as illustrated in U.S. Design Pat. 392,777.
Figure 2:
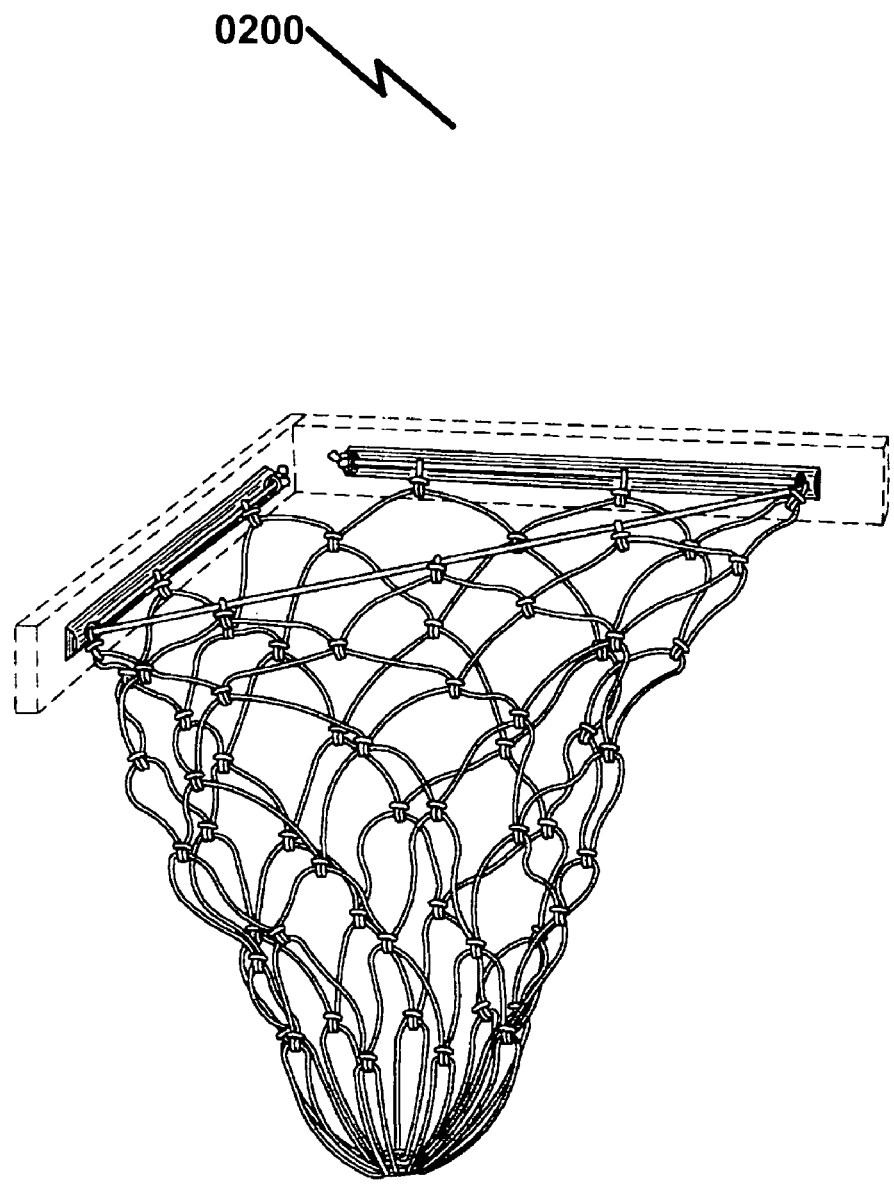
FIG. 2 illustrates a prior art hay feeder as illustrated in U.S. Design Pat. 449,905.
Figure 3:
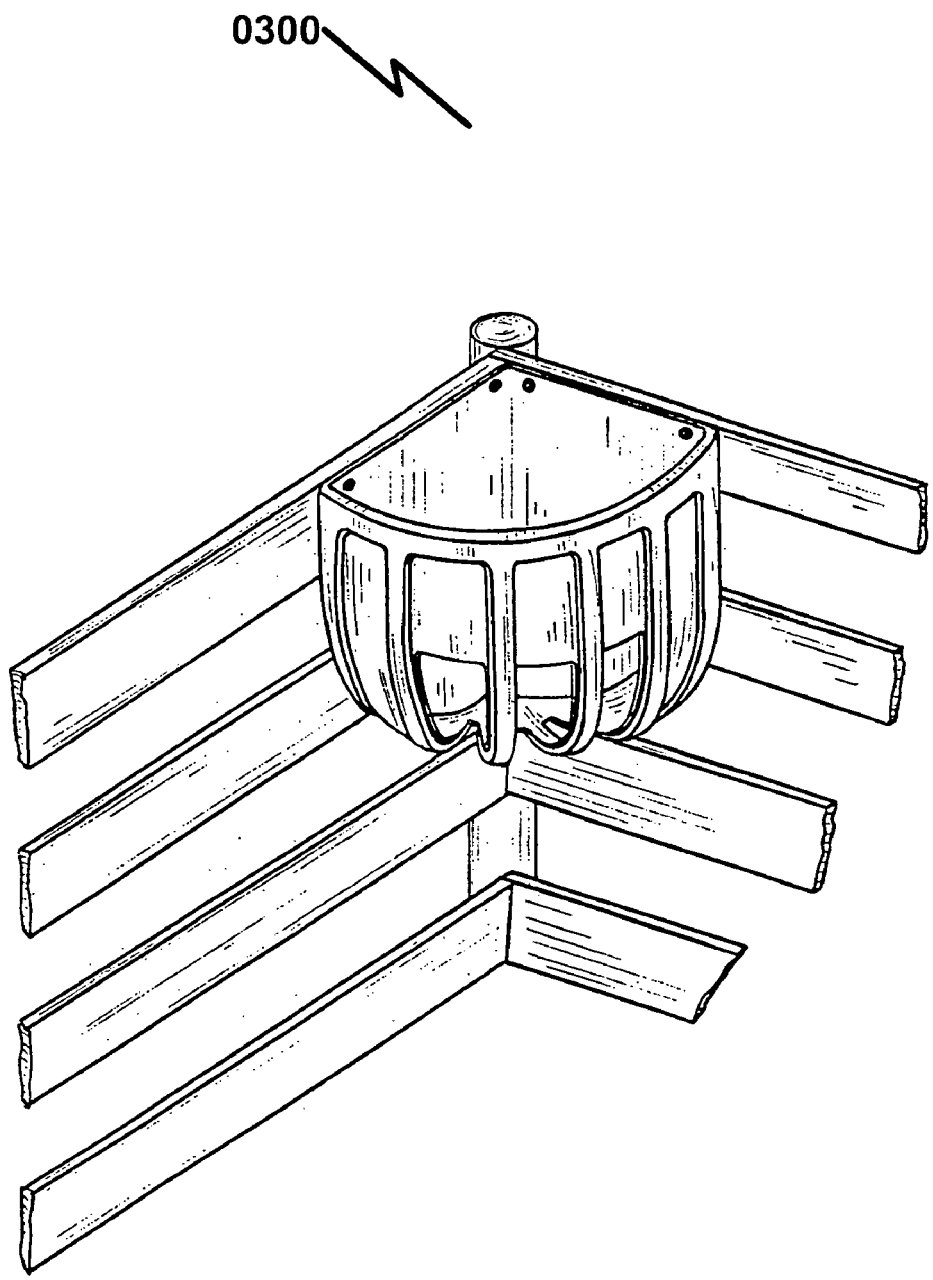
FIG. 3 illustrates a prior art hay feeder as illustrated in U.S. Utility Patent 4,488,510.
Figure 4:
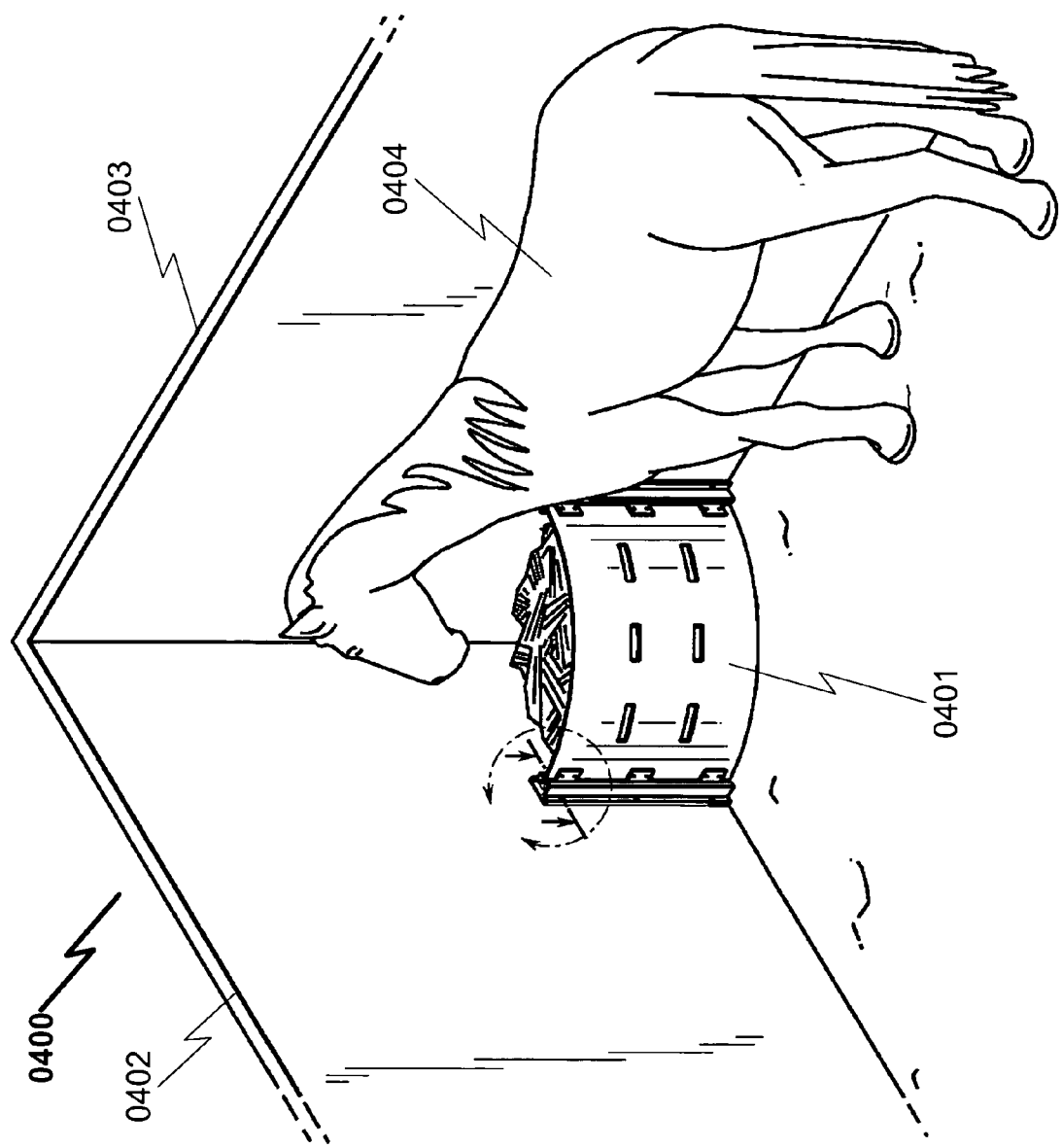
FIG. 4 illustrates a system view of a preferred exemplary embodiment of the present invention as applied to a horse feeder application.
Figure 5:
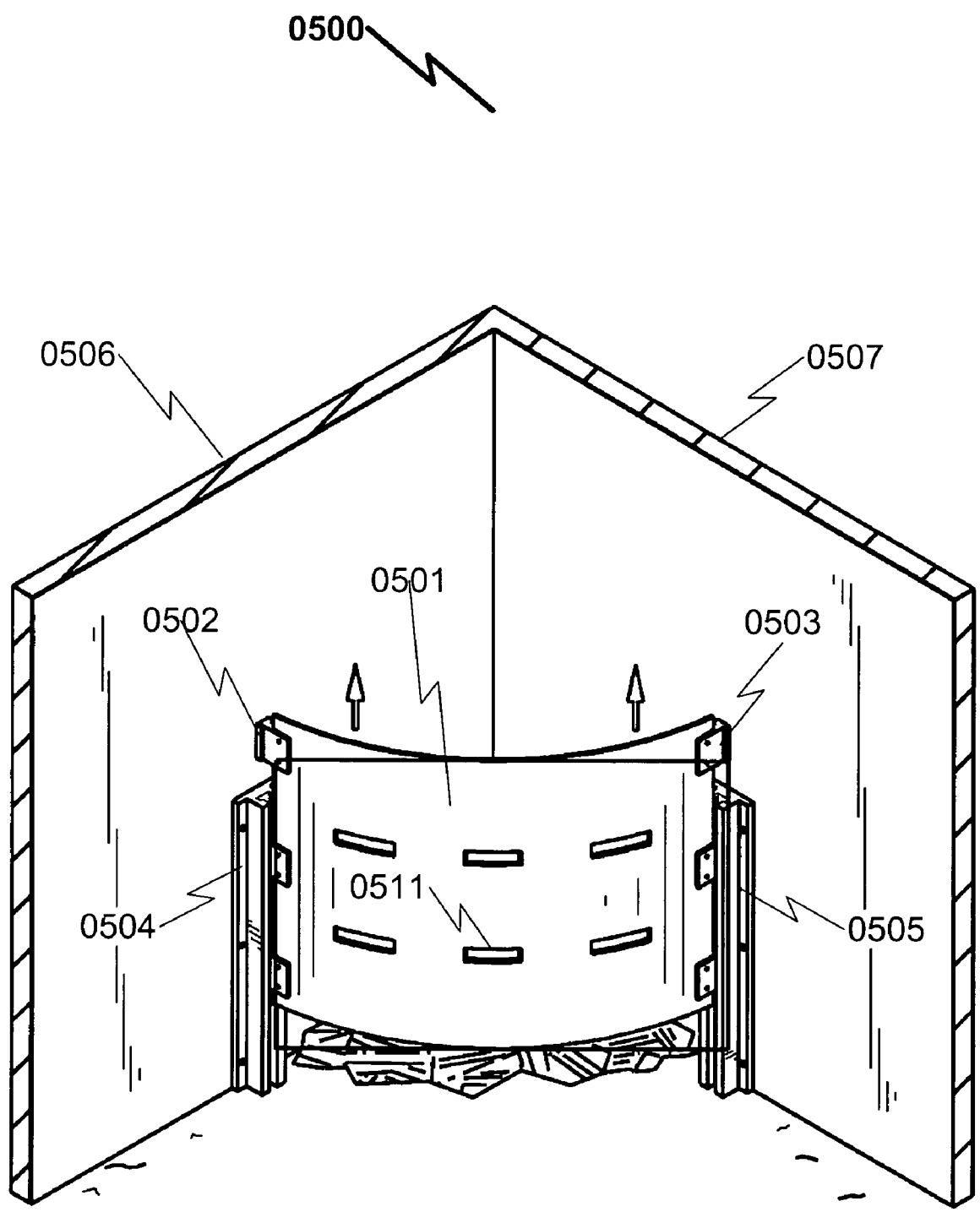
FIG. 5 illustrates a perspective view of a preferred exemplary embodiment of the present invention utilizing uniform edge retaining means.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a HAY FEEDER. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Materials not Limitive

The present invention may be constructed of a variety of materials, including but not limited to plastic, metal, wood, etc. The general construction illustrated herein is not intended to limit the scope of materials suitable for this application. One skilled in the art will recognize that the system may be constructed of a wide variety of materials without departing from the scope of the invention as taught herein.

Integration of System Elements

One skilled in the art will recognize that the flexible arcuate front wall (0501) may be integrated with the retaining wall clips (0502, 0503) with no loss in the teaching of the present invention. The embodiments shown herein utilize separate retaining wall clips (0502, 0503) which are attached to the side of the arcuate front wall (0501). However, one skilled in the art will realize that suitable plastic or other fabrication techniques may incorporate the retaining clips as part of the manufacture of the arcuate front wall (0501).

Exemplary Construction/Assembly View (0600)

Figure 6:
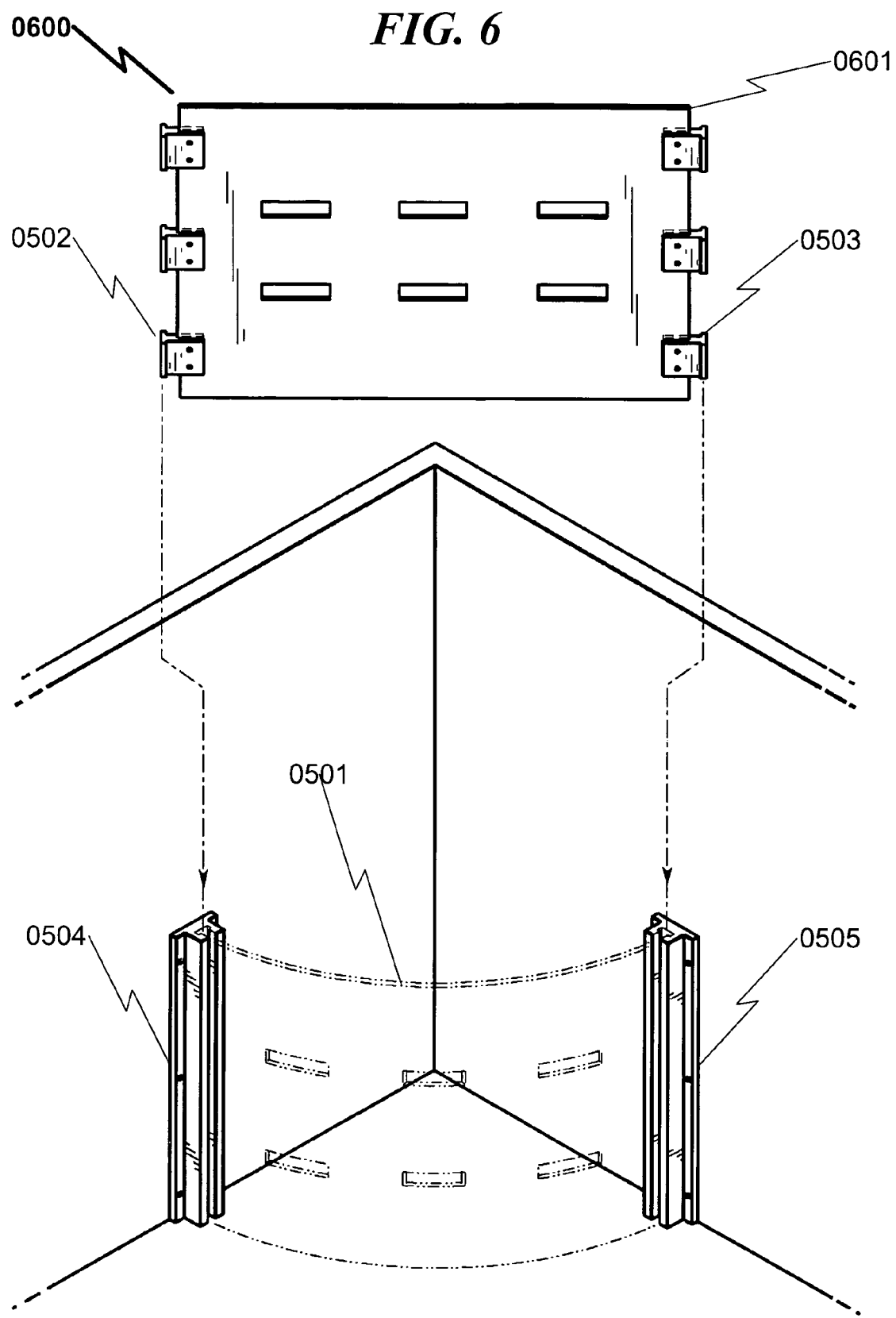
FIG. 6 illustrates a perspective assembly view of a preferred exemplary embodiment of the present invention utilizing uniform edge retaining means.

The present invention may be generally illustrated by the exemplary construction/assembly embodiment illustrated in FIG. 6 (0600). Here the generally rectangular arcuate front wall (0501) may be initially constructed of a flat piece of material (0601) which is flexed to fit the form of the arcuate front wall (0501) as it is inserted into the stall slide rails (0504, 0505) via use of the mating retaining wall clips (0502, 0503).

Note that this exemplary construction view illustrates the arcuate front wall (0501) attached to the stall slide rails (0504, 0505) via use of multiple mating retaining wall clips (0502, 0503). However, one skilled in the art will quickly recognize that the retaining wall clips (0502, 0503) may run the entire length of the arcuate front wall instead of being placed in multiple discrete locations. Additionally, one skilled in the art will recognize that the retaining wall clips may be integrated into the construction of the arcuate front wall with no loss of generality in the teachings of the present invention.

Retaining Wall Clips/Stall Slide Rail Detail (0700, 0800)

Figure 7:
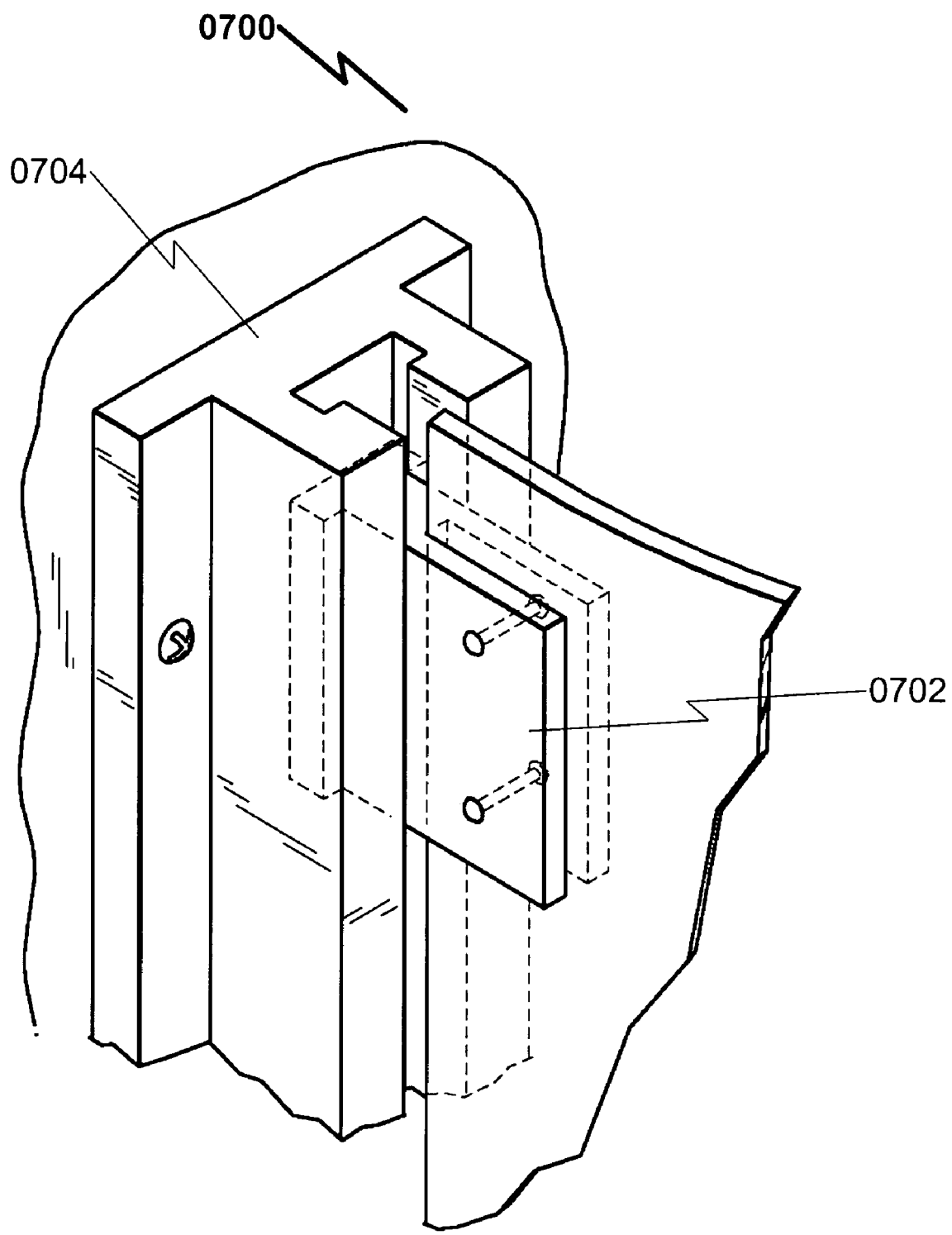
FIG. 7 illustrates a perspective detail view of a preferred exemplary embodiment of the present invention edge retaining means.

As illustrated in the detail perspective of FIG. 7 (0700), the retaining wall clips (0702) mate with the stall slide rails (0704) utilizing a preferred T-slot attachment mechanism. As mentioned previously, the present invention is not limited to the use of a T-slot as the attaching means between the retaining wall clips and the stall slide rails. One skilled in the art will quickly recognize that the arcuate front wall (0501) can incorporate the retaining wall clips in the form of a T-slot or other slot attachment system without loss of generality in the invention. One possible embodiment of the present invention utilizes a cylindrical edge lip to the arcuate front wall that mates with a corresponding cylindrical cavity in the stall slide rails.

Figure 8:
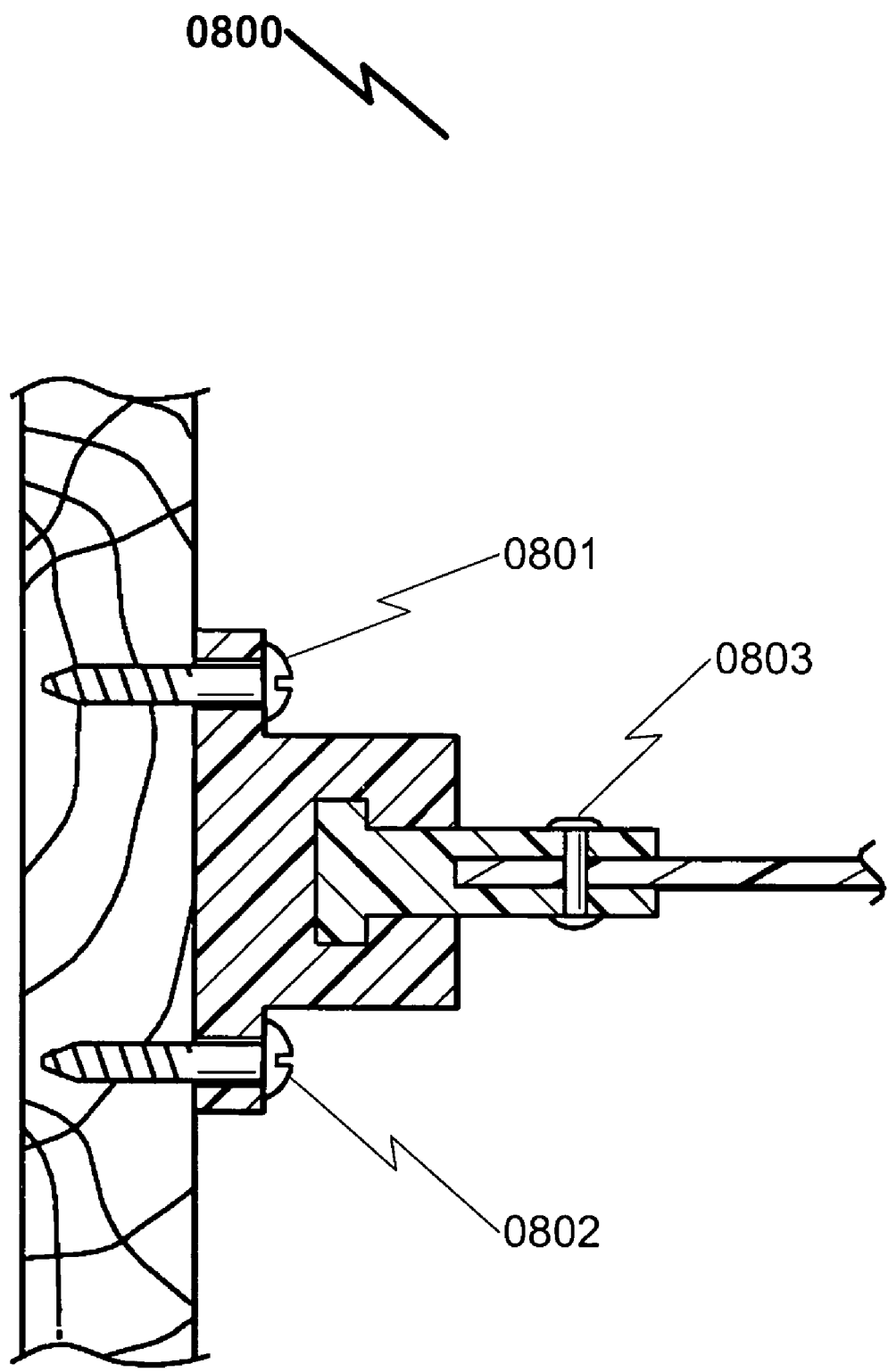
FIG. 8 illustrates a sectional detail view of a preferred exemplary embodiment of the present invention edge retaining means.

As illustrated in FIG. 8 (0800), the system illustrated in FIG. 7 (0700) may be secured to the animal stall walls via the use of screws (0801, 0802) or other fasteners. Additionally, this figure illustrates how the retaining wall clips can be attached to the arcuate front wall (0501) via the use of rivets (0803) or other fasteners.

Alternate Embodiment (0900, 1000)

Figure 9:
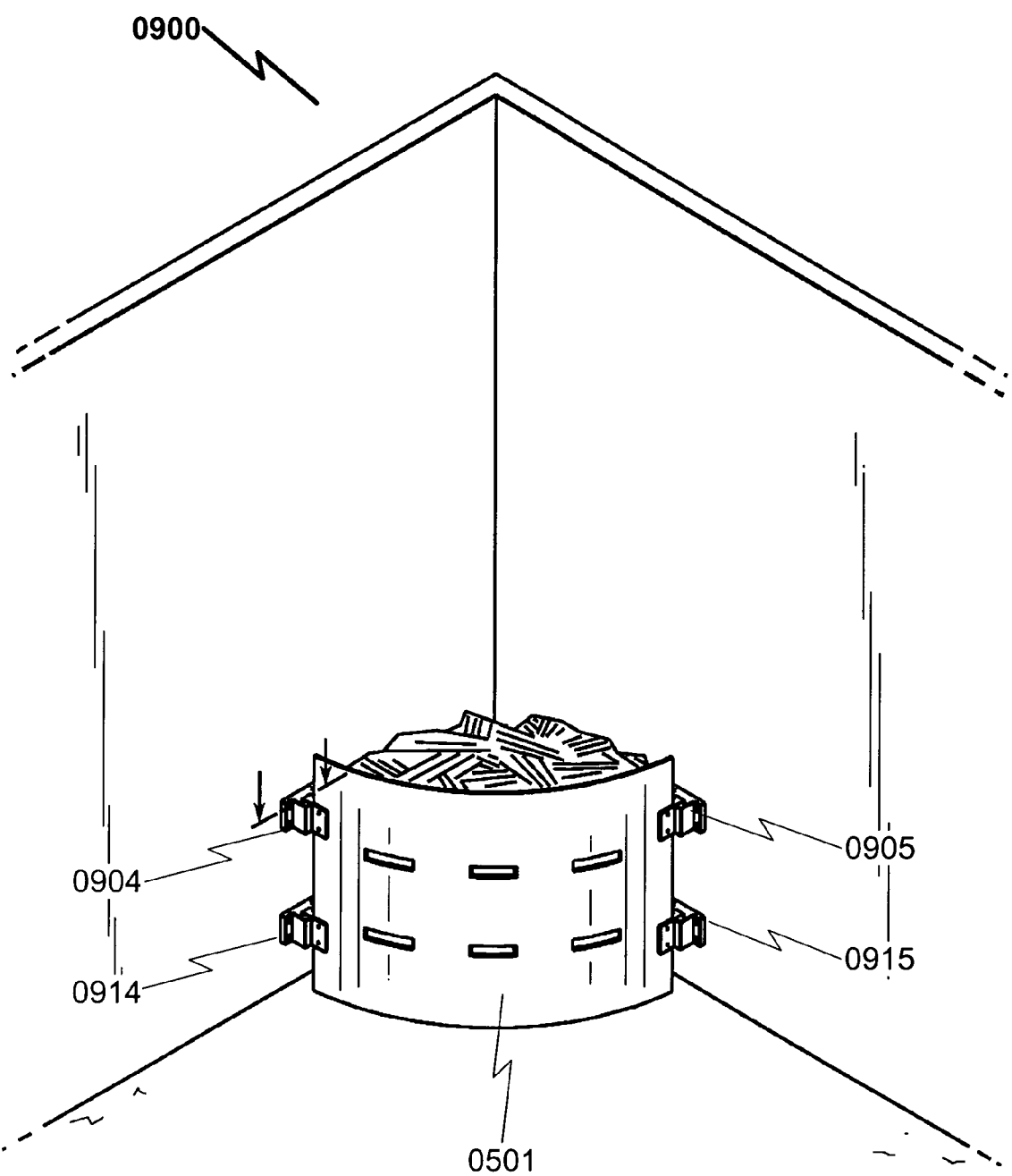
FIG. 9 illustrates a perspective view of an alternate preferred exemplary embodiment of the present invention utilizing a multi-piece edge retaining means.

As illustrated in FIG. 9 (0900), the present invention may utilize a variety of means to attach the arcuate front wall (0501) to the corner of the animal stall. In the alternate embodiment illustrated in FIG. 9 (0900), multiple stall slide rails (0904, 0914, 0905, 0915) are utilized to mate with the retaining wall clips to secure the arcuate front wall (0501) to the animal stall walls.

Figure 10:
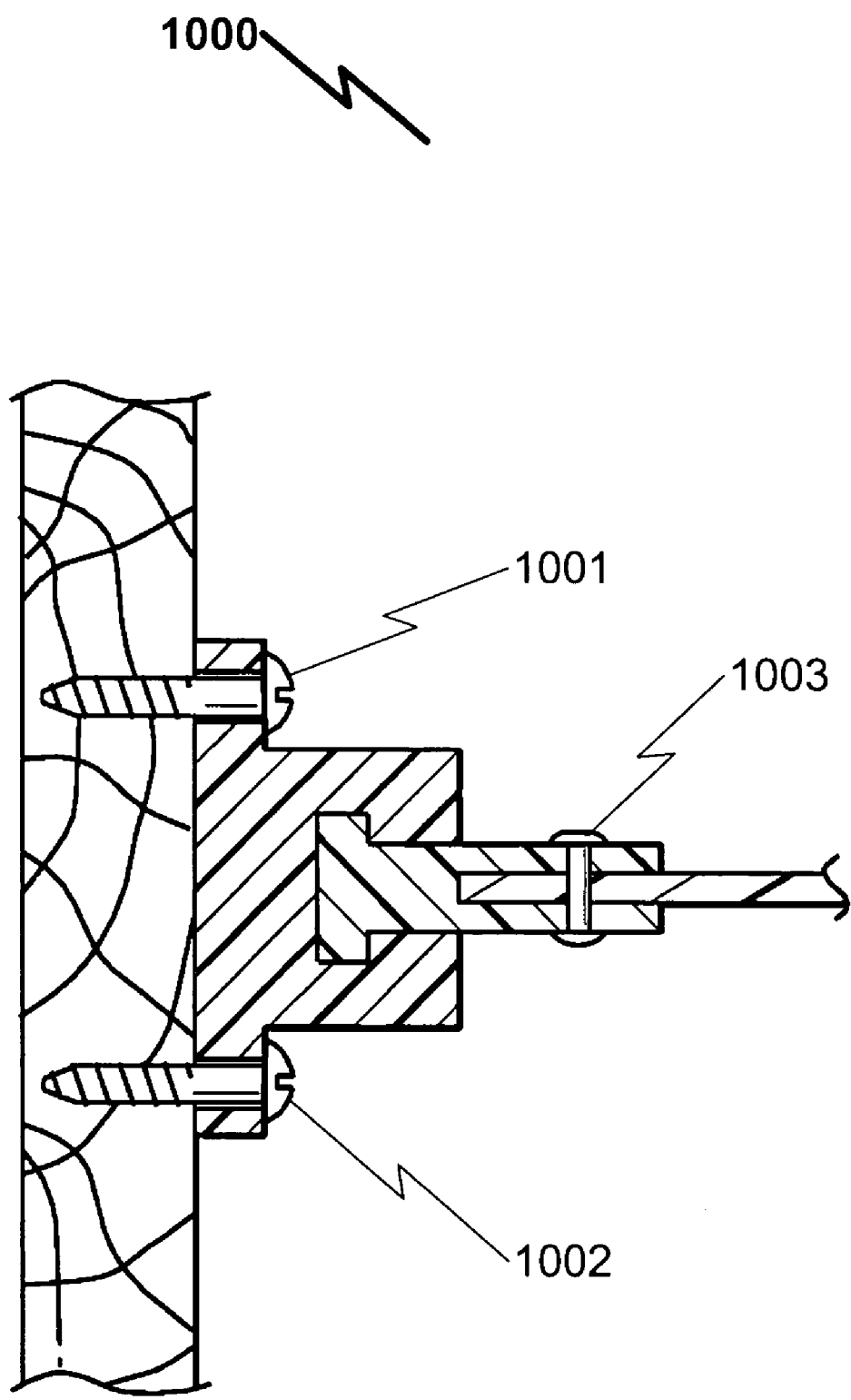
FIG. 10 illustrates a sectional detail view of an alternate preferred exemplary embodiment of the present invention utilizing a multi-piece edge retaining means.

As illustrated in FIG. 10 (1000), the system illustrated in FIG. 9 (0900) may be secured to the animal stall walls via the use of screws (1001, 1002) or other fasteners. Additionally, this figure illustrates how the retaining wall clips can be attached to the arcuate front wall (0501) via the use of rivets (1003) or other fasteners.

System Variations

The present invention anticipates a wide variety of variations in the basic theme of construction. The examples presented previously do not represent the entire scope of possible usages. They are meant to cite a few of the almost limitless possibilities.

CONCLUSION

A hay feeder system which incorporates a curved arcuate section of plastic or other semi-rigid material formed to mate with the corner of an animal stall or other animal pen has been disclosed. The hay feeder system permits easy placement of hay or other feed for a horse or other animal to feed on. Additionally, the disclosed invention permits easy cleaning of the hay or other feed from the floor surrounding the hay feeder.

CLAIMS

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A hay feeder system comprising:
   (a) flexible arcuate front wall;
   (b) retaining wall clips attached to the sides of said arcuate front wall; and
   (c) stall slide rails which mate with said retaining wall clips to secure said arcuate front wall to the corner walls of an animal stall wherein
   said flexible arcuate front wall rests on the ground at said corner walls of said animal stall.

2. The hay feeder system of claim 1 wherein said flexible arcuate front wall further comprises an air vent.

3. The hay feeder system of claim 1 wherein said flexible arcuate front wall further comprises plastic.

4. The hay feeder system of claim 1 wherein said retaining wall clips further comprise plastic.

5. The hay feeder system of claim 1 wherein said stall slide rails further comprise plastic.

6. The hay feeder system of claim 1 wherein said flexible arcuate front wall is formed of a flat material that is flexed to form an arcuate shape prior to attachment to said stall slide rails.

7. The hay feeder system of claim 1 wherein said flexible arcuate front wall is integrated with said retaining wall clips to form a unitary structure.

8. The hay feeder system of claim 1 wherein said retaining wall clips run the entire length of the sides of said flexible arcuate front wall.

9. The hay feeder system of claim 1 wherein said retaining wall clips mate to said stall slide rails via the use of a T-slot.

10. The hay feeder system of claim 1 wherein said retaining wall clips are attached to said flexible arcuate front wall with rivets.

* * * * *